US012189398B2

(12) United States Patent
Grebner et al.

(10) Patent No.: US 12,189,398 B2
(45) Date of Patent: Jan. 7, 2025

(54) CIRCUITRY AND METHOD

(71) Applicant: Sony Group Corporation, Tokyo (JP)

(72) Inventors: Timo Grebner, Ulm (DE); Christian Waldschmidt, Ulm (DE); Daniel Felipe Ardila Palomino, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 337 days.

(21) Appl. No.: 17/667,540

(22) Filed: Feb. 9, 2022

(65) Prior Publication Data

US 2022/0261008 A1 Aug. 18, 2022

(30) Foreign Application Priority Data

Feb. 16, 2021 (EP) ..................................... 21157448

(51) Int. Cl.
*G05D 1/00* (2024.01)
(52) U.S. Cl.
CPC ......... *G05D 1/0274* (2013.01); *G05D 1/0088* (2013.01); *G05D 1/0257* (2013.01); *G05D 1/0278* (2013.01)
(58) Field of Classification Search
CPC .............................. G01S 13/60; G01S 13/931
USPC .................................................. 700/246–264
See application file for complete search history.

(56) References Cited

U.S. PATENT DOCUMENTS

| | | | | |
|---|---|---|---|---|
| 11,274,929 | B1* | 3/2022 | Afrouzi ...................... | G06T 7/62 |
| 2002/0003488 | A1* | 1/2002 | Levin ..................... | G08G 1/163 |
| | | | | 342/60 |
| 2014/0129027 | A1* | 5/2014 | Schnittman .......... | G05D 1/0242 |
| | | | | 700/253 |
| 2018/0345958 | A1* | 12/2018 | Lo ..................... | G08G 1/096725 |
| 2019/0384318 | A1* | 12/2019 | Fuchs ..................... | G01S 13/86 |
| 2020/0103523 | A1* | 4/2020 | Liu .......................... | G01S 13/89 |
| 2020/0307561 | A1* | 10/2020 | Bush .................. | B60W 60/0016 |

(Continued)

FOREIGN PATENT DOCUMENTS

| | | | | |
|---|---|---|---|---|
| CN | 108759833 A | | 11/2018 | |
| CN | 110007670 A | * | 7/2019 | ......... G01C 21/3492 |

(Continued)

OTHER PUBLICATIONS

Rlabbe (2020, Oct. 13). "Kalman-and-Bayesian-Filters-in-Python" https://github.com/rlabbe/Kalman-and-Bayesian-Filters-in-Python/blob/f15d2b5316aa6171e21539e823a24fc241840b68/12- Particle-Filters.ipynb (Year: 2020).*

(Continued)

*Primary Examiner* — Adam R Mott
*Assistant Examiner* — James Miller Watts, III
(74) *Attorney, Agent, or Firm* — XSENSUS LLP

(57) ABSTRACT

A circuitry for simultaneous localization and mapping for a mobile platform, wherein the circuitry is configured to:
estimate, based on obtained radar detection data, an ego-motion of the mobile platform; and
update, based on the estimated ego-motion and the obtained radar detection data, a set of particles, wherein each particle of the set of particles includes a location and an orientation of the mobile platform and an occupancy grid map that represents an environment of the mobile platform, wherein the occupancy grid map includes a plurality of cells and each cell of the plurality of cells is assigned an occupation probability which indicates a probability that the cell is occupied by a target.

20 Claims, 6 Drawing Sheets

(56) References Cited

U.S. PATENT DOCUMENTS

| | | | | |
|---|---|---|---|---|
| 2020/0341486 A1* | 10/2020 | Dia | .................. | G06T 7/579 |
| 2020/0370920 A1* | 11/2020 | Ahmed | .................. | G01S 13/89 |
| 2020/0409382 A1* | 12/2020 | Herman | .............. | G05D 1/0214 |
| 2021/0101624 A1* | 4/2021 | Philbin | ................ | G06F 18/251 |

FOREIGN PATENT DOCUMENTS

| | | | | | |
|---|---|---|---|---|---|
| CN | 110888125 | B | | 6/2020 | |
| CN | 112306058 | A | * | 2/2021 | |
| CN | 115113629 | A | * | 9/2022 | .............. B60Q 1/50 |
| DE | 102020210380 | A1 | * | 2/2022 | |
| EP | 2479584 | A2 | * | 7/2012 | ............ G01S 17/42 |
| WO | 2019/185739 | A1 | | 10/2019 | |

OTHER PUBLICATIONS

Anonymous. "Detection of Signals in Noise." Archive.Org, Aug. 30, 2017, web.archive.org/web/20170830045122/https://123.physics.ucdavis.edu/week_5_files/filters/matched_filter.pdf. (Year: 2017).*
Schneider, Barry. Army Research Laboratory, 1999, A Matlab Radar Range Equation and Probability of Detection Evaluation Tool, https://apps.dtic.mil/sti/tr/pdf/ADA360040.pdf. Accessed 2 Sep. 2024. (Year: 1999).*
Deusch Hendrik: "Random Finite Set-Based Localization and SLAM for Highly Automated Vehicles", Schriftenreihe des Instituts fur Mess-, Regel-und Mikrotechnik, Universitat Ulm, Dec. 1, 2016, XP055843799, 149 pages.
Steiner et al., "Ego-Motion Estimation Using Distributed Single-Channel Radar Sensors", DOI: 10.1109/ICMIM.2018.8443509, 2018, 5 pages.

\* cited by examiner

A
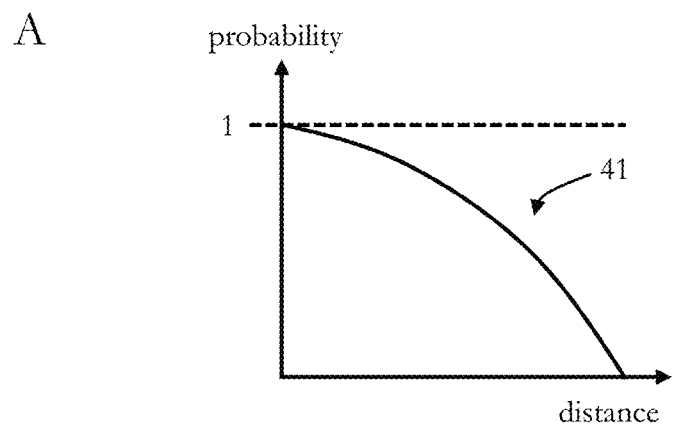
B
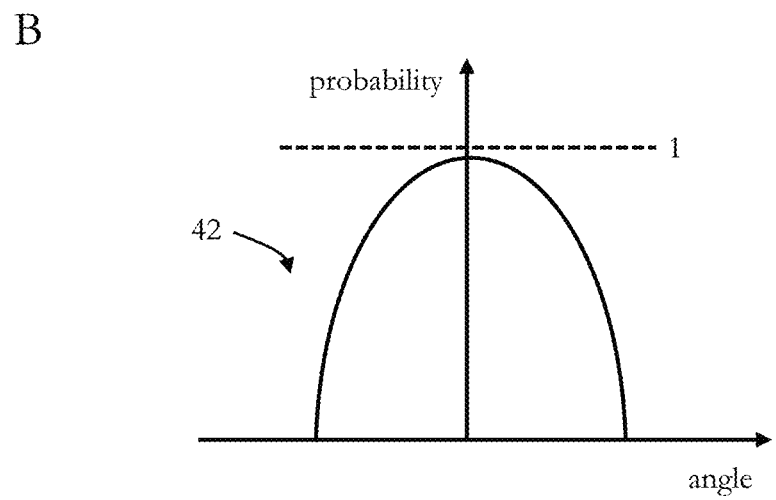
C
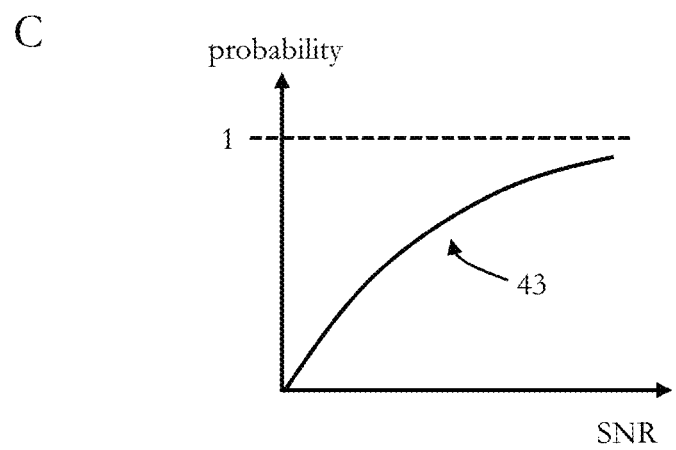
Fig. 3

110 ↘

```
┌─────────────────────────────────────────────────────────────┐
│ Estimating, based on obtained radar detection data, an ego-motion of │
│                   the mobile platform 111                    │
└─────────────────────────────────────────────────────────────┘
                              │
┌─────────────────────────────────────────────────────────────┐
│ Updating, based on the estimated ego-motion and the obtained radar de-│
│ tection data, a set of particles, wherein each particle of the set of particles │
│ includes a location and an orientation of the mobile platform and an oc- │
│ cupancy grid map that represents an environment of the mobile plat- │
│ form, wherein the occupancy grid map includes a plurality of cells and │
│ each cell of the plurality of cells is assigned an occupation probability │
│ which indicates a probability that the cell is occupied by a target 112 │
└─────────────────────────────────────────────────────────────┘
                              │
┌─────────────────────────────────────────────────────────────┐
│ Determining a particle weight for each particle of the set of particles, │
│ wherein the particle weight indicates a quality estimation of the particle │
│                              113                            │
└─────────────────────────────────────────────────────────────┘
                              │
┌─────────────────────────────────────────────────────────────┐
│ Determining the particle weight of each particle of the set of particles │
│ based on the occupation probability of at least a part of the cells of the │
│   plurality of cells of the occupancy grid map of the particle 114 │
└─────────────────────────────────────────────────────────────┘
                              │
┌─────────────────────────────────────────────────────────────┐
│ Performing particle resampling when the particle weight of a predeter- │
│ mined number of particles of the set of particles is below a predeter- │
│                   mined threshold 115                        │
└─────────────────────────────────────────────────────────────┘
                              │
┌─────────────────────────────────────────────────────────────┐
│ Performing the particle resampling including drawing with replacement │
│  from the set of particles, wherein a probability that a particle of the set │
│ of particles is drawn is based on the corresponding particle weight of the │
│                        particle 116                          │
└─────────────────────────────────────────────────────────────┘
```

Fig. 5

CIRCUITRY AND METHOD

CROSS-REFERENCE TO RELATED APPLICATION

This application claims priority from EP 21157448.8, filed on Feb. 16, 2021, the entire contents of which are incorporated herein by reference.

TECHNICAL FIELD

The present disclosure generally pertains to a circuitry for simultaneous localization and mapping for a mobile platform and a corresponding method.

TECHNICAL BACKGROUND

Generally, mobile platforms such as vehicles (e.g. cars) or mobile robots are known. It is envisaged that these mobile platforms navigate fully autonomously in the next years.

One challenge for an implementation of autonomous mobile platforms is estimating a pose of the mobile platform which refers to estimating a location and an orientation of the mobile platform with respect to a predetermined coordinate system.

It is known that localization and orientation estimations can be performed based on a GPS ("Global Positioning System") sensor in combination with a magnetometer that can provide longitude and latitude coordinates as well as orientation information about the mobile platform. However, as generally known, it may not provide a reliable measurement in all scenarios, for instance, in places with poor GPS reception as tunnels, indoor parking lots and garages. Some localization systems combine the GPS measurements with IMU ("Inertial Measurement Unit") sensors for providing improved location estimations, however, as generally known, these systems may have long-term characteristics such that a drift from the actual location may occur.

A second challenge for the implementation of autonomous mobile platforms is a mapping of the environment of the mobile platform. The mapping refers to finding a representation of the static environment, so that the mobile platform can navigate safely in it. This representation of the environment should include information regarding a location of obstacles or targets.

For obtaining location information of the targets, typically, a sensor (e.g. LIDAR or cameras) installed on the mobile platform measures the environment. However, the sensor obtains detection data in a local coordinate system of the sensor and, thus, in order to integrate measurements over the time, the location and orientation of the mobile platform, on which the sensor is installed, is required. As mentioned, GPS and/or IMU sensors can be used for the location and orientation of the mobile platform, but as discussed, this setup may have limitations in some scenarios.

Additionally, radar sensors are known. Different radar sensors are known which can measure a relative (radial) velocity of an object, a relative (radial) velocity of an object and a distance to the object, or a relative (radial) velocity of an object, a distance to the object and a detection angle to the object. Typically, radar sensors emit a high-frequency electromagnetic wave (for example, in the GHz (Gigahertz) regime such that wavelengths are in the mm (millimeter) range) and detect a portion of the electromagnetic wave that has been reflected by an object. For example, based on a time-of-flight and a Doppler shift of the reflected electromagnetic wave, radar sensors can provide radar detection data indicating an estimation of the relative (radial) velocity of the object and the distance to the object.

Generally, a common technique is SLAM, which stands for Simultaneous Localization and Mapping. This technique provides a mathematical framework to estimate at the same time the pose of the mobile platform (location and orientation) and the map of the environment.

As part of the implementation of SLAM algorithms, it is typically necessary to provide prior information about the movement of the platform, so that an initial prediction of the pose is closer to the actual pose. In order to provide this initial prediction of the pose, extra sensors such as IMUs may be used, however, this may increase the costs of the system.

Some SLAM implementations use a landmark approach or feature-based approach, which means that the detection data is pre-processed to determine where relevant objects for localization (landmarks/features) are. After landmark extraction, a matching process of the recently extracted landmarks and a current map is required. The landmark extraction and matching may reduce robustness of the system and may be computationally expensive.

Although there exist techniques for localization and mapping, it is generally desirable to improve the exiting techniques.

SUMMARY

According to a first aspect the disclosure provides a circuitry for simultaneous localization and mapping for a mobile platform, the circuitry being configured to:
  estimate, based on obtained radar detection data, an ego-motion of the mobile platform; and
  update, based on the estimated ego-motion and the obtained radar detection data, a set of particles, wherein each particle of the set of particles includes a location and an orientation of the mobile platform and an occupancy grid map that represents an environment of the mobile platform, wherein the occupancy grid map includes a plurality of cells and each cell of the plurality of cells is assigned an occupation probability which indicates a probability that the cell is occupied by a target.

According to a second aspect the disclosure provides a method for simultaneous localization and mapping for a mobile platform, the method comprising:
  estimating, based on obtained radar detection data, an ego-motion of the mobile platform; and
  updating, based on the estimated ego-motion and the obtained radar detection data, a set of particles, wherein each particle of the set of particles includes a location and an orientation of the mobile platform and an occupancy grid map that represents an environment of the mobile platform, wherein the occupancy grid map includes a plurality of cells and each cell of the plurality of cells is assigned an occupation probability which indicates a probability that the cell is occupied by a target.

Further aspects are set forth in the dependent claims, the following description and the drawings.

BRIEF DESCRIPTION OF THE DRAWINGS

Embodiments are explained by way of example with respect to the accompanying drawings, in which:

FIG. 3 schematically illustrates in FIG. 3A in graph an embodiment of a probability distribution of a distance of a target to a mobile platform, in FIG. 3B in a graph an embodiment of a probability distribution of a detection angle of a target to a radar sensor on a mobile platform, and in FIG. 3C in a graph an embodiment of a probability distribution of a detection level of a target;

FIG. 5 schematically illustrates in a flow diagram a third embodiment of a method for simultaneous localization and mapping.

DETAILED DESCRIPTION OF EMBODIMENTS

Figure 1:
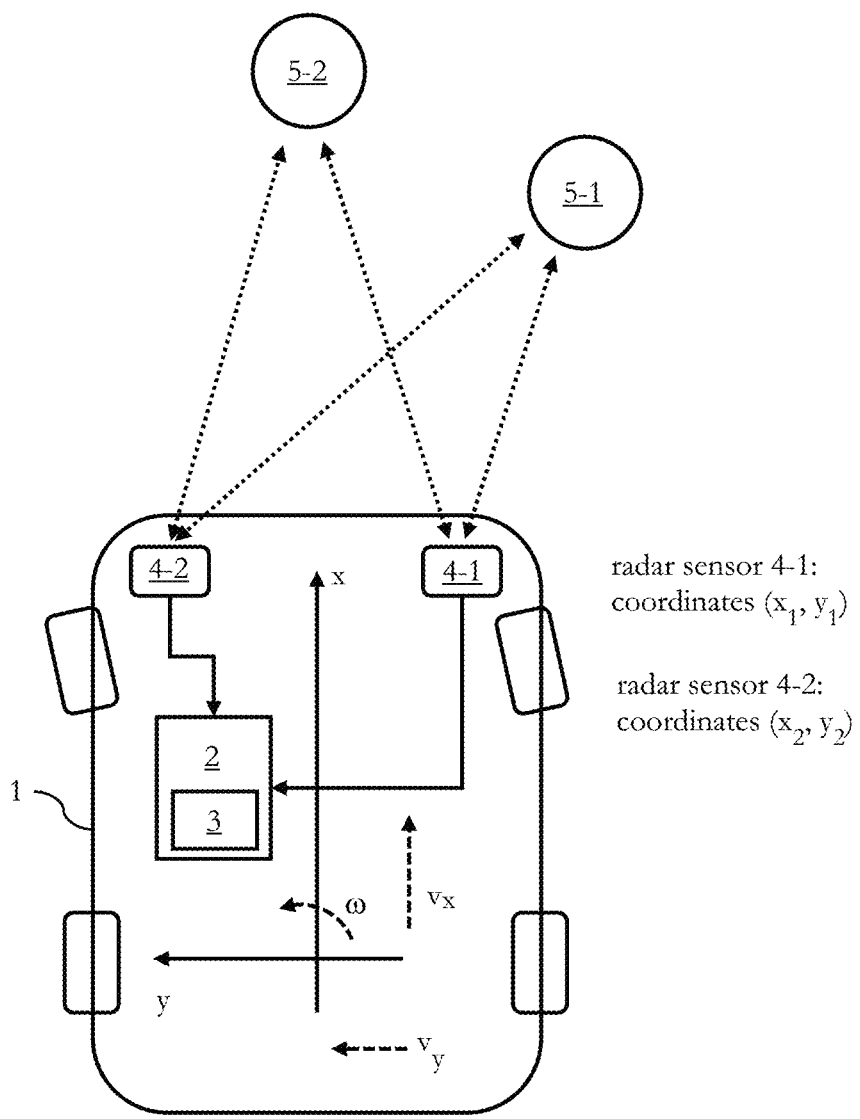
FIG. 1 schematically illustrates an embodiment of a vehicle including a first embodiment of a circuitry for simultaneous localization and mapping.

Before a detailed description of the embodiments under reference of FIG. 1 is given, general explanations are made.

As mentioned in the outset, a common technique for autonomous mobile platforms is SLAM, which stands for Simultaneous Localization and Mapping. This technique provides a mathematical framework to estimate at the same time the pose of the mobile platform (location and orientation) and the map of the environment.

As part of the implementation of SLAM algorithms, as mentioned in the outset, it is typically necessary to provide prior information about the movement of the platform, so that an initial prediction of the pose may be closer to the actual pose. In order to provide this initial prediction of the pose, extra sensors such as IMUs may be used, however, this may increase the costs of the system.

As further mentioned in the outset, some SLAM implementations use a landmark approach or feature-based approach, which means that the detection data is pre-processed to determine where relevant objects for localization (landmarks/features) are. After landmark extraction, a matching process of the recently extracted landmarks and a current map is required. The landmark extraction and matching may reduce robustness of the system and may be computationally expensive.

It has been recognized that pose estimation of a mobile platform in space and simultaneously generating a map of the environment of the mobile platform should be based on radar measurements of a plurality radar sensors attached to the mobile platform, since further sensors may not be required anymore, thereby simplifying data acquisition, data synchronization and data association for generating self-localization information and the map of the environment.

It has further been recognized that the map of the environment should be based on an occupancy grid map for simplifying data association for map generation.

Therefore, angle, distance and relative (radial) velocity information of (stationary) targets in the channel are determined from the radar detections for using them for ego-motion estimation of the mobile platform and using the estimated ego-motion for prior localization information for a grid-map based SLAM algorithm.

Hence, some embodiments pertain to a circuitry for simultaneous localization and mapping for a mobile platform, wherein the circuitry is configured to:
estimate, based on obtained radar detection data, an ego-motion of the mobile platform; and
update, based on the estimated ego-motion and the obtained radar detection data, a set of particles, wherein each particle of the set of particles includes a location and an orientation of the mobile platform and an occupancy grid map that represents an environment of the mobile platform, wherein the occupancy grid map includes a plurality of cells and each cell of the plurality of cells is assigned an occupation probability which indicates a probability that the cell is occupied by a target.

The mobile platform may be vehicle or a movable robot or the like. Typically, the mobile platform moves on the ground or a surface of an object such that the simultaneous localization and mapping is performed for a two-dimensional space and, thus, any locations, orientations and movements are indicated with respect to coordinates of the two-dimensional space.

The circuitry may be included or may be part of a computer (e.g. a board-computer in a vehicle such as a car) or a control (such as a control in a vehicle or a robot) or may be provided separately.

The circuitry may be based on or may include or may be implemented as integrated circuitry logic or may be implemented by a CPU (central processing unit), an application processor, a graphical processing unit (GPU), a microcontroller, an FPGA (field programmable gate array), an ASIC (application specific integrated circuit) or the like or a combination thereof. The functionality may be implemented by software executed by a processor such as a microprocessor or the like.

The circuitry may be based on or may include or may be implemented by typical electronic components configured to achieve the functionality as described herein.

The circuitry may be based on or may include or may be implemented in parts by typical electronic components and integrated circuitry logic and in parts by software.

The circuitry may include data storage capabilities to store data such as memory which may be based on semi-conductor storage technology (e.g. RAM, EPROM, etc.) or magnetic storage technology (e.g. a hard disk drive) or the like.

The circuitry may include a data bus for receiving and transmitting data over the data bus. The circuitry may implement communication protocols for receiving and transmitting the data over the data bus. The data bus may be or may be based on a Controller Area Network (CAN) bus, an IC (Inter-Integrated Circuit) interface, or the like.

The radar detection data is obtained from at least one radar sensor installed on the mobile platform. In some embodiments, two radar sensors are installed on the mobile platform. In some embodiments, two radar sensors are installed on each side of the mobile platform. Thus, in some embodiments, a plurality of radar sensors is installed on the mobile platform and the radar detection data is obtained from the plurality of radar sensors.

Typically, in some embodiments, radar sensors emit a high-frequency electromagnetic wave (for example, in the GHz (Gigahertz) regime such that wavelengths are in the mm (millimeter) range) and detect a portion of the electromagnetic wave that has been reflected by an object.

Different radar sensors are known which may measure a relative (radial) velocity of an object (of a plurality of objects), a relative (radial) velocity of an object (of a plurality of objects) and a distance to the object (of a plurality of objects), or a relative (radial) velocity of an object (of a plurality of objects), a distance to the object (of a plurality of objects) and a detection angle to the object (of a plurality of objects).

The radar detection data may include at least one of the relative (radial) velocity of the object (the plurality of objects), the distance to the object (the plurality of objects) and the detection angle to the object (the plurality of objects). The radar detection data may include data, generated by a radar sensor or a plurality of radar sensors, which is indicative for at least one of the relative (radial) velocity of the object (the plurality of objects), the distance to the object (the plurality of objects) and the detection angle to the object (the plurality of objects) such that the circuitry can determine the relative (radial) velocity of the object (the plurality of objects), the distance to the object (the plurality of objects) and the detection angle to the object (the plurality of objects) based on the data.

In some embodiments, based on a time-of-flight and a Doppler shift of the reflected electromagnetic wave, a radar sensor or a plurality of radar sensors provides radar detection data indicating the relative (radial) velocity of the object and the distance to the object.

The ego-motion includes a first velocity (component) of the mobile platform in a first direction of a local coordinate system which has an origin typically on the mobile platform, a second velocity (component) in a second direction of the local coordinate system which is orthogonal to the first direction of the local coordinate system, and a yaw rate of the mobile platform around a third direction of the local coordinate system which is orthogonal to the first and the second direction of the local coordinate system. For example, in a Cartesian coordinate system, the first direction may be the x-direction, the second direction may be the y-direction and the third direction may be the z-direction.

As, in some embodiments, the radar detection data indicates the relative (radial) velocity of an object, all objects that are stationary in a global coordinate system (such as a coordinate system fixed to a location on a ground or surface on which the mobile platform is moving) indicate the velocity of the mobile platform. In the following, stationary objects that can be detected by radar sensors are referred to as targets. Thereby, analyzing a (radial) velocity profile of all detected targets allows an estimation of the mobile platform's ego-motion.

Additionally, in such embodiments, the radar detection data indicates the distance to the targets. Thus, in such embodiments, the detection angle of the target (for a given sensor) is obtained by the intersection of two circles with centers in the radar sensors locations (assuming that the installation locations of the radar sensors on the mobile platform are known with respect to the local coordinate system of the mobile platform) and a radius corresponding to the distance to the target. In such embodiments, the detection angle of the target with respect to the local coordinate system of the mobile platform is obtained if the installation angle of the radar sensor is known.

In some embodiments, the radar sensor or the plurality of radar sensors has a plurality of receiving antennas. In such embodiments, the detection angle of the target is determined based on an Angle of Arrival (AoA) estimation which is based on information from the plurality of receiving antennas (typically a time difference of arrival between individual receiving antennas of the plurality of receiving antennas).

For two consecutive frames, in some embodiments, the location and orientation of the mobile platform are estimated, based on the estimated ego-motion, with respect to a previous location and orientation (which may initially be set arbitrarily) by integrating the velocity (both velocity components) and the yaw rate in time (e.g., with the time interval between the two consecutive frames).

Moreover, in some embodiments, a location of the target is estimated, based on the estimated location and orientation of the mobile platform, the detection angles of the targets (assuming that the installation orientation of the radar sensor on the mobile platform is known with respect to the local coordinate system of the mobile platform) and the distance to the targets. Thereby, the environment of the mobile platform can be simultaneously mapped by using only radar sensors such that further sensors may not be required.

However, generally, as the ego-motion (and thus the location and orientation of the mobile platform) is only an estimation which is based on targets which location is not precisely known, a map of the environment is only based on a single estimation ("a guess") which may not represent the true environment accurately.

Moreover, for larger environments and larger movements of the mobile platform, an error may add up due to the integration of the ego-motion.

Therefore, a set of particles is initialized. Each particle of the set of particles includes a location and an orientation of the mobile platform and an occupancy grid map that represents an environment of the mobile platform.

In some embodiments, the circuitry is further configured to initialize the location and orientation of the mobile platform of each particle of the set of particles with a random value. For example, each particle may be initialized with the origin of a global coordinate system.

Each occupancy grid map includes or is based on or implemented by a plurality of cells and each cell of the plurality of cells is assigned an occupation probability which indicates a probability that the cell is occupied by a target.

Generally, each occupancy grid map is associated with the global coordinate system. The plurality of cells may be squares, rectangles, triangles, polygons, or the like which divide the global coordinate system such that a location in the global coordinate system is associated with one cell of the plurality of cells. The plurality of cells thus provides a global grid for the environment.

In the following, a local grid is a (small) part of the global grid which is associated with a radar sensor and its (changing) location within the global grid, since radar detections are performed with respect to a local coordinate system of the radar sensor. Generally, coordinates in the local coordinate system can be transformed into coordinates of the local coordinate system of the mobile platform (assuming installation location and orientation of the radar sensor on the mobile platform is known) which can be transformed into coordinates of the global coordinate system.

A cell of the plurality of cells is either occupied or it is not occupied, there are no partially occupied cells (which is assumed in the following) and the probability assigned to each cell indicates that the cell is fully occupied or fully unoccupied.

In some embodiments, the circuitry is further configured to initialize the occupancy grid map of each particle of the set of particles based on a free-space model.

Each radar sensor has a maximum detection distance and a field-of-view in which targets can be detected. Thus, when the occupancy grid map is initialized, for example, the maximum detection distance and the field-of-view around the initial radar sensor location define an area in the local grid of the radar sensor in which targets can be detected. Assuming, when the method for simultaneous localization and mapping is started, no targets are present, this area around each radar sensor can be used as prior information for each occupancy grid map. The probability of cells of each occupancy grid map in these areas may be set to "0" and the probability of all other cells may be set to "0.5" (as no information is available). Typically, this is known as the free-space model.

The set of particles is updated continuously for sampling the location and orientation of the mobile platform and the environment.

As mentioned above, integrating (in time) the estimated ego-motion allows estimating the location and orientation of the mobile platform.

Hence, in some embodiments, the circuitry is further configured to perform dead reckoning based on the estimated ego-motion, wherein the location and the orientation of the mobile platform of each particle of the set of particles are updated based on the dead reckoning.

Thereby, the estimated ego-motion provides prior localization information for the generation of the occupancy grid map of each particle.

In order to sample the localization and orientation probability space of the mobile platform, it has been recognized that at least one of the location and orientation of the particles should be scattered around the estimated location and orientation.

Hence, in some embodiments, the circuitry is further configured to perform scattering of at least one of the location and the orientation of the mobile platform, wherein at least one of the location and the orientation of the mobile platform is updated based on the scattering.

The scattering may be based on a Gaussian distribution with the estimated location and orientation of the mobile platform as an average location and with a standard deviation which is based on, for example, a measurement uncertainty of the estimated location and orientation of the mobile platform. For example, the standard deviation may be based on a resolution of the radar sensors, a distance and angle uncertainty of the radar detections and the like.

Hence, as each particle of the set of particles includes a scattered location and orientation of the mobile platform, the locations of the targets which are detected based on a distance and a detection angle to the mobile platform are also scattered.

In some embodiments, the circuitry is further configured to estimate, based on obtained radar detection data, a location of the target, wherein the occupation probability is updated based on the estimated location of the target.

As the radar detections indicate the distance to the target and the detection angle of the target, the location of the target is estimated based on the (scattered) location and orientation of the mobile platform.

Thus, each occupancy grid map corresponding to a (scattered) particle is also sampled according to the scattering. Thereby, self-localization and map accuracy may continuously improve.

In some embodiments, the occupation probability is updated further based on a detection probability of the target, wherein the detection probability is based on a first probability distribution of a distance of the target to the mobile platform, a second probability distribution for a detection angle of the target to a radar sensor on the mobile platform, and a third probability distribution for a detection noise level of the target.

The detection probability may depend on the distance of the target to the mobile platform, since a radar sensor has a limited maximum detection distance. The detection probability may depend on the detection angle of the target to a radar sensor on the mobile platform (and thus also to the mobile platform as a relation between their coordinate systems is fixed), since targets with a larger angle with respect to the radar sensor may be detected less likely. The detection probability may depend on a noise level of the target, since targets which may have a low reflection may be detected with a lower signal amplitude which may thus be less likely to be detected.

Hence, the detection probability may be modeled based on probability distributions for the distance, the detection angle and the noise level. For example, these probability distributions may be obtained experimentally.

Generally, however, some scattered particles may not converge to a map of the environment which is an accurate representation of the true environment and, thus, a quality of the map or of the map hypothesis should be determined in order to eliminate those particles which may not accurately represent the true environment.

Hence, in some embodiments, the circuitry is further configured to determine a particle weight for each particle of the set of particles, wherein the particle weight indicates a quality estimation of the particle.

The particle weight may be determined with contrast maximization or entropy minimization procedures, as generally known.

However, due to the already existing occupancy grid map and the probabilities assigned to the cells of the occupancy grid map, it may be used to estimate the quality of the particle.

In some embodiments, the particle weight of each particle of the set of particles is determined based on the occupation probability of at least a part of the cells of the plurality of cells of the occupancy grid map of the particle.

For example, an average probability of the occupancy grid map in a local update area corresponding to the local grids of the radar sensors may be used to determine the particle weight. For example, a number of targets in the occupancy grid map may be used to determine the particle weight. In some embodiments, a combination of the above two examples is used by multiplying the two particle weights.

In some embodiments, the circuitry is further configured to perform particle resampling when the particle weight of a predetermined number of particles of the set of particles is below a predetermined threshold. In some embodiments, the resampling is performed every n-th frame, wherein "n" is an Integer (n=1 or 2 or 3 or . . . ). In some embodiments, the resampling is performed every (pseudo-)randomly selected frame.

Generally, resampling may include methods for estimating an accuracy of a sample and for validating models by using a subset of available data.

In some embodiments, the particle resampling includes drawing with replacement from the set of particles, wherein a probability that a particle of the set of particles is drawn is based on the corresponding particle weight of the particle.

In such embodiments, particles with a higher particle weight are more likely to be kept/drawn in/from the set of particles, since they are considered to be more representative of the true environment. Further, in such embodiments, in order to remain, for example, a constant particle number for sampling the probability space, the number of particles drawn from the set of particles is equal to the number of particles in the set of particles (without limiting the present disclosure in this regard).

Some embodiments pertain to a (corresponding) method for simultaneous localization and mapping for a mobile platform, the method including:

estimating, based on obtained radar detection data, an ego-motion of the mobile platform; and updating, based on the estimated ego-motion and the obtained radar detection data, a set of particles, wherein each particle of the set of particles includes a location and an orientation of the mobile platform and an occupancy grid map that represents an environment of the mobile platform, wherein the occupancy grid map includes a plurality of cells and each cell of the plurality of cells is assigned an occupation probability which indicates a probability that the cell is occupied by a target.

The method may be performed by a circuitry as described herein. The method may be performed by integrated circuitry logic or a CPU (central processing unit), an application processor, a graphical processing unit (GPU), a microcontroller, an FPGA (field programmable gate array), an ASIC (application specific integrated circuit) or the like or a combination thereof. The method may be implemented by software executed by a processor such as a microprocessor or the like.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Generally, the method for simultaneous localization and mapping (and a circuitry which is configured to perform the method) is a SLAM algorithm based on occupancy grid maps that uses radar based ego-motion estimation for estimating the prior localization information by dead-reckoning. The SLAM algorithm is based on the fastSLAM approach, which relies on a particle filter to estimate the localization information and the map representation is an occupancy grid map, which assigns a probability to the occupancy state of the environment by discretizing the driving area with a grid.

Returning to FIG. 1, there is schematically illustrated an embodiment of a vehicle 1 including a first embodiment of a circuitry 3 for simultaneous localization and mapping.

The vehicle 1 includes a board-computer 2 which includes the circuitry 3.

The vehicle 1 includes a first radar sensor 4-1 and a second radar sensor 4-2.

The first and the second radar sensor 4-1 and 4-2 are installed at a front side of the vehicle 1.

Each of the first and the second radar sensor 4-1 and 4-2 emit an electromagnetic wave in the GHz regime for detecting targets 5-1 and 5-2 which reflect at least a part of the emitted electromagnetic wave back to the respective radar sensor 4-1 and 4-2 as illustrated by the dotted lines. Each of the targets 5-1 and 5-2 is a stationary target.

For the purpose of illustration only, two targets 5-1 and 5-2 are shown, however, the present disclosure is not limited to any specific number of targets if at least two targets are detected. For the purpose of illustration only, two radar sensors 4-1 and 4-2 are shown, however, the present disclosure is not limited to any specific number of radar sensors, for example, two radar sensors may be installed at each side of the vehicle 1.

The first radar sensor 4-1 is installed at a location $(x_1, y_1)$ with respect to a local coordinate system of the vehicle 1, wherein an origin of the local coordinate system of the vehicle 1 is in the middle of the rear axis of the vehicle 1. The first radar sensor 4-1 is installed with an orientation of substantially 0° with respect to the local coordinate system of the vehicle 1.

The second radar sensor 4-2 is installed at a location $(x_2, y_2)$ with respect to the local coordinate system of the vehicle 1. The second radar sensor 4-2 is installed with an orientation of substantially 0° with respect to the local coordinate system of the vehicle 1.

The vehicle 1 moves with a velocity $(v_x, v_y)$ with respect to the x- and y-axis of the local coordinate system of the vehicle 1 and turns with a yaw rate ω around the z-axis (not shown; out of plane of FIG. 1 and orthogonal to the x- and y-axis).

The first and the second radar sensor 4-1 and 4-2 detect the reflected electromagnetic wave from the targets 5-1 and 5-2, when the target 5-1 and 5-2 is in the field-of-view and the maximum detection distance of the radar sensor 4-1 and 4-2, and generate radar detection data indicating a relative radial velocity of the targets 5-1 and 5-2 and a distance to the targets 5-1 and 5-2. The relative radial velocity of the targets 5-1 and 5-2 is indicative for the velocity of the vehicle 1 as they are stationary targets.

Generally in the following, $s=1, \ldots, S$ denotes the radar sensor, $q_s=1, \ldots, Q_s$ denotes the targets detected by radar sensor s, and $\phi_{s,q_s}$ denotes a detection angle of the target $q_s$ of radar sensors.

The relative radial velocity of a target 5-1 and 5-2 detected by a radar sensor 4-1 and 4-2 is along the dotted lines from the respective radar sensor 4-1 and 4-2 to the respective target 5-1 and 5-2 and the respective detection angle is the angle of the dotted line in the local coordinate system of the vehicle 1 (actually in a local coordinate system of the respective radar sensor 4-1 and 4-2, however, as the installation angle of the radar sensor 4-1 and 4-2 in the vehicle 1 is substantially 0°, both are basically the same; if not, the installation angle is added to the detection angle to obtain the detection angle with respect to the local coordinate system of the vehicle 1).

The relative radial velocities of targets which are detected by radar sensor s is denoted by:

$$\vec{v}_s^r = \begin{pmatrix} -v_{s,1}^r \\ \vdots \\ -v_{s,Q_s}^r \end{pmatrix}.$$

A location matrix of radar sensor s is denoted by:

$$\hat{S}_s = \begin{pmatrix} -y_s & 1 & 0 \\ x_s & 0 & 1 \end{pmatrix},$$

wherein $x_s$ and $y_s$ are the installation coordinates of the radar sensor s in the local coordinate system of the vehicle 1.

A detection angle matrix of radar sensor s is denoted by:

$$\hat{D}_s = \begin{pmatrix} \cos(\phi_{s,1}) & \cdots & \sin(\phi_{s,1}) \\ \vdots & \ddots & \vdots \\ \cos(\phi_{s,Q_s}) & \cdots & \sin(\phi_{s,Q_s}) \end{pmatrix}.$$

The circuitry 3 obtains the radar detection data and estimates an ego-motion of the vehicle 1 based on the obtained radar detection data according to the following procedure.

The circuitry 3 determines, based on the distances to the targets 5-1 and 5-2 of each radar sensor 4-1 and 4-2, intersection points of circles around the location of each radar sensor 4-1 and 4-2, wherein each circle has a radius corresponding to the distance to the respective target 5-1 and 5-2. Thereby, the detection angles $\phi_{s,q_s}$ and, thus, the detection angle matrix $\hat{D}_s$ for each radar sensor s is determined.

In alternative embodiments, the radar sensors 4-1 and 4-2 have a plurality of receiving antennas. In such embodiments, the detection angles $\phi_{s,q_s}$ are determined based on an Angle of Arrival (AoA) estimation which is based on information from the plurality of receiving antennas, wherein the information is a time difference of arrival between individual receiving antennas of the plurality of receiving antennas.

Generally, due to the determination of the intersection points "ghost targets" may occur which are not real objects. Moreover, moving objects may be included in the radar detection data which do not indicate the velocity of the vehicle 1.

Thus, a data filtering is applied (by the circuitry 3) based on the RANdom Sample Concensus (RANSAC) algorithm which allows filtering of the radar detection data with respect to stationary objects (targets) such as the targets 5-1 and 5-2, as generally known. This is based on analyzing a velocity profile of the detected objects and based on the assumption that stationary objects (targets) have the same velocity profile in contrast to moving objects and ghost targets which are less likely to have the same velocity profile, since they do not only depend on the ego-motion of the vehicle 1. Thereby, a target list is generated which includes the stationary objects (targets) such as the targets 5-1 and 5-2.

Then, the ego-motion of the vehicle is estimated by:

$$\begin{pmatrix} \vec{v}_1^r \\ \vdots \\ \vec{v}_S^r \end{pmatrix} = \begin{pmatrix} \hat{D}_1 \cdot \hat{S}_1 \\ \vdots \\ \hat{D}_S \cdot \hat{S}_S \end{pmatrix} \cdot \begin{pmatrix} \omega \\ v_x \\ v_y \end{pmatrix}.$$

This equation may be solved by a numeric approach by applying a least square minimization for determining the smallest square distance between an estimate of the relative radial velocities and the measured relative velocities.

Thereby, the circuitry 3 estimates the ego-motion of the vehicle 1.

Figure 2:
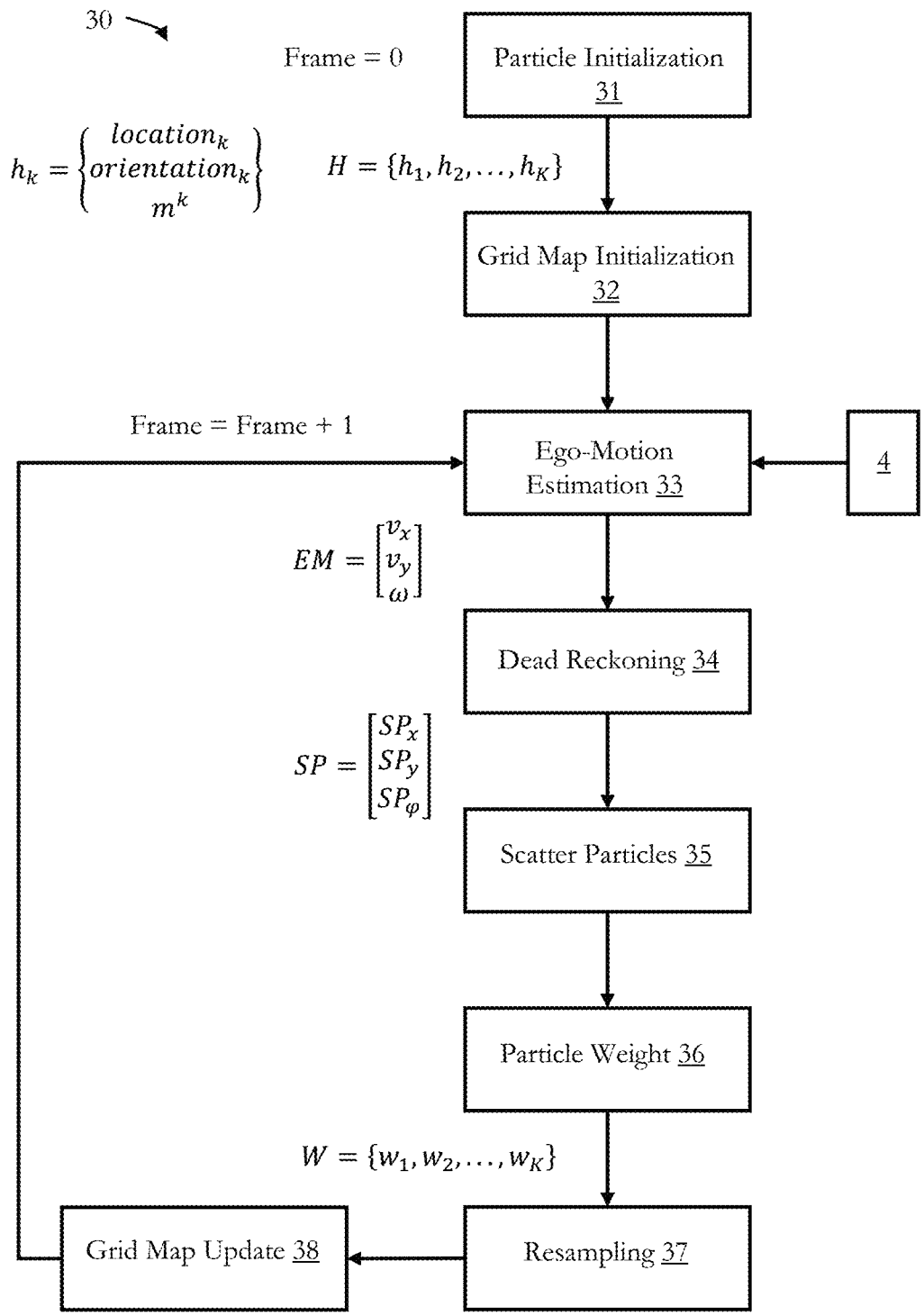
FIG. 2 schematically illustrates in a flow diagram a first embodiment of a method for simultaneous localization and mapping.

FIG. 2 schematically illustrates in a flow diagram a first embodiment of a method 30 for simultaneous localization and mapping.

The method 30 is performed by the circuitry 3 discussed under reference of FIG. 1.

At 31, a set of particles is initialized, wherein each particle of the set of particles includes a location and an orientation of the vehicle 1 and an occupancy grid map that represents an environment of the vehicle 1.

The set of particles is denoted by H={$h_1, \ldots, h_K$} and a particle is denoted by $h_k$, with k=1, ..., K, wherein K is equal to the number of particles in the set of particles. The particle is thus given by:

$$h_k = \begin{Bmatrix} location_k \\ orientation_k \\ m^k \end{Bmatrix}.$$

Here, $m^k$ is the occupancy grid map of the particle $h_k$.

Each occupancy grid map includes a plurality of cells and each cell of the plurality of cells is assigned an occupation probability which indicates a probability that the cell is occupied by a target.

In the following, the cells of a global grid of an occupancy grid map are enumerated by i∈I, wherein I is the total number of cells of the occupancy grid map. The global grid is given with respect to a global coordinate system, wherein a location in the global coordinate system is associated with one cell of the global grid.

In the following, the cells of a local grid centered in the location of a radar sensor, for example 4-1 and 4-2 of FIG. 1, are enumerated by j∈J, wherein J is the total number of cells of the local grid. The local grid is given with respect to a local coordinate system of the radar sensor, wherein a location in the local coordinate system of the radar sensor is associated with one cell of the local grid. As mentioned further above, the local grid is a (small) part of the global grid of the occupancy grid map and, thus, the location/cell of the local grid of the radar sensor is associated with a location/cell of the global grid.

Generally, the location and the orientation of the vehicle 1 are given with respect to a global coordinate system (reference system). In the initialization phase, the global coordinate system can be selected arbitrarily so that further localization results are given in this global coordinate system. Since the global coordinate system is arbitrary, the initial location and orientation of the vehicle 1 is arbitrary as well.

Here, at Frame=0 (frame counter) which is the starting frame of the method 30 for simultaneous localization and mapping, the location of the vehicle 1 is set to the origin of the global coordinate system for each particle of the set of particles.

At 32, each occupancy grid map is initialized based on a free-space model. For each particle, all cells of the occupancy grid map which are outside a field-of-view of a radar sensor and a maximum detection distance of the radar sensor is assigned a probability of "0.5", all other cells is assigned a probability of "0". This is used further below as prior information for updating the probability of the cells. The frame counter is incremented.

At 33, the circuitry 3 obtains radar detection data from the radar sensors 4-1 and 4-2 (summarized by reference sign 4). Based on the obtained radar detection data, the circuitry 3 estimates an ego-motion of the vehicle 1, as discussed in detail under reference of FIG. 1 (thus, unnecessary repetition is omitted). Thereby, also a target list is generated.

At 34, the circuitry 3 performs dead reckoning based on the estimated ego-motion, wherein the location and the orientation of the vehicle 1 of each particle of the set of particles are updated based on the dead reckoning.

The estimated ego-motion is integrated to estimate the location and orientation of the vehicle 1 (SP) according to:

$$SP_{Frame+1} = \begin{Bmatrix} SP_{Frame,x} - \sin(SP_{Frame,\varphi} + \vartheta_v) \cdot r + \sin(\omega \cdot dt + \\ (SP_{Frame,\varphi} + \vartheta_v)) \\ SP_{Frame,y} + \cos(SP_{Frame,\varphi} + \vartheta_v) \cdot r - \cos(\omega \cdot dt + \\ (SP_{Frame,\varphi} + \vartheta_v)) \\ SP_{Frame,\varphi} + \omega \cdot dt \end{Bmatrix},$$

wherein $$r = \frac{\sqrt{v_x + v_y}}{\omega},$$

$$SP = \begin{pmatrix} SP_x \\ SP_y \\ SP_\varphi \end{pmatrix}.$$

Here, dt is the time interval between two consecutive frames and $\vartheta_v$ is the angle between $v_x$ and $v_y$.

At 35, the circuitry 3 scatters at least one of the location and the orientation of the vehicle 1, wherein at least one of the location and the orientation of the vehicle 1 is updated based on the scattering.

The particles are scattered based on an error model for the current location and orientation, as mentioned further above, for sampling the probability space. Thus, each particle may include a different location and orientation of the vehicle 1.

In the first frame after initializing, particle weighting 36 and resampling 37 are skipped, since all occupancy grid maps include the same information. The particle weighting 36 and resampling 37 is described further below, when the next frame (at least the second frame after initialization) is processed.

Hence, at 38, the current set of occupancy grid maps is updated according to the following procedure, assuming the pose estimation of the vehicle 1 is correct such that the map update problem is isolated from the pose estimation problem:

The free-space model describes the probability distribution of the local grid if not target is located in the radar channel. Areas which are outside the field-of-view and the maximum detection distance of the radar sensor are not directly detectable and, thus, the probability distribution is proportional to:

$$\tilde{p}_{j,loc} \sim \left(\frac{r_{c,j}}{r_{max}}\right)^4 \cdot \left(1 - (\cos(\phi_{c,j}))^2\right).$$

Here, j is the run variable over the cells of the local grid and c is the cell identification of the radar sensor in the global grid.

The targets of the target list (e.g. 5-1 and 5-2 of FIG. 1) are then modeled with a target model, wherein each target probability is based on a Gaussian distribution. The magnitude of the Gaussian distribution is based on a distance of the target to the vehicle 1, a detection angle of the target to a radar sensor (e.g. 4-1 or 4-2 on the vehicle 1) and a noise level of the target which are modeled by probability distributions as schematically shown in FIG. 3.

FIG. 3 schematically illustrates in FIG. 3A in graph an embodiment of a probability distribution 41 of a distance of a target to a mobile platform, in FIG. 3B in a graph an embodiment of a probability distribution 42 of a detection angle of a target to a radar sensor on the mobile platform, and in FIG. 3C in a graph an embodiment of a probability distribution 43 of a detection level of a target.

As depicted in FIG. 3A, the detection probability for targets with larger distance to the vehicle 1 is modeled to decrease.

As depicted in FIG. 3B, the detection probability for targets with larger detection angle to the vehicle 1 (actually to the radar sensor, however, as mentioned above, due to the installation angle of substantially 0°, both are the same) is modeled to decrease.

As depicted in FIG. 3C, the detection probability for targets with larger SNR (signal-to-noise ratio; detection level) is modeled to increase.

The detection probability $p_T$ of a target (here, the magnitude of the Gaussian distribution) is determined by $$p_T = \frac{p_{T,\phi} + p_{T,r} + p_{T,SNR}}{3}.$$

Here, the distance probability distribution 41 is $p_{T,r}$, the detection angle probability distribution 42 is $p_{T,\phi}$, and the detection level probability distribution 43 is $p_{T,SNR}$.

The target probability is then given by:

$$g_X(x, \mu_q, \sigma) = p_T \cdot \frac{f_X(x, \mu_q, \sigma)}{2 \cdot f_X(\mu_q, \mu_q, \sigma)} + 0.5$$

Here, x is an independent location variable and $\mu_q$ is the estimated location of the target q.

The probability that a cell j of the local grid is occupied is then determined by:

$$p_{j,loc} = \max(\tilde{p}_{j,loc}, g_X(x_j, \mu_q, \sigma)).$$

Hence, the circuitry 3 estimates, based on obtained radar detection data, a location of the target, wherein the occupation probability is updated based on the estimated location of the target, wherein the occupation probability is updated further based on a detection probability of the target, wherein the detection probability is based on a first probability distribution of a distance of the target to the mobile platform, a second probability distribution for a detection angle of the target to a radar sensor on the mobile platform, and a third probability distribution for a detection noise level of the target.

For updating the occupancy grid map, basically three assumptions are made: the cell is either occupied or is not occupied, the targets are stationary, and the cells are independent of each other.

Then, the probability that a cell of the occupancy grid map is occupied can be modeled as:

$$p(m | z_{1:t}, x_{1:t}) = \prod_{i \in I} p(m_i | z_{1:t}, x_{1:t})$$

Here, $z_{1:t}$ denotes all measurements up to the time t and $x_{1:t}$ all sensor locations up to the time t.

The probability that a cell of the occupancy grid map is occupied can then be simplified to:

$$p(m_i | z_{1:t}, x_{1:t}) =$$

$$\left(1 + \frac{1 - p(m_i | z_t, x_t)}{p(m_i | z_t, x_t)} \cdot \frac{1 - p(m_i | z_{1:t-1}, x_{1:t-1})}{p(m_i | z_{1:t-1}, x_{1:t-1})} \cdot \frac{p(m_i)}{1 - p(m_i)}\right)^{-1}.$$

Here, the first term is the current measurement and, thus, this term is given by.

$$p(m_i | z_t, x_t) = p_{j,loc}.$$

As $p_{j,loc}$ depends on the location of the target, which depends on the estimated and scattered location and orientation of the vehicle 1, the scattering allows also sampling of the environment.

The probability that the cell of the occupancy grid map is occupied is thus updated based on a measurement of one radar sensor. For a plurality of radar sensors (e.g., the radar sensors 4-1 and 4-2), the probability that the cell of the occupancy grid map is occupied is updated iteratively based on the measurement of each radar sensor. Here, for example, at first, the probability is updated based on the measurement of radar sensor 4-1 and then the probability is further updated based on the measurement of radar sensor 4-2 taken into account the probability updated by radar sensor 4-1 as a previous probability that the cell is occupied (which is then accounted for in the second term of the equation above).

Moreover, the second term is the previous probability that the cell is occupied and, thus, by scattering the environment is also sampled. Thereby, simultaneous localization and mapping is provided solely based on radar detections, wherein the pose of the vehicle 1 and the map(s) are continuously updated for improving an accuracy of the map(s).

The third term is the prior information, which is here based on the free-space model.

After the update of the occupancy grid maps, the next frame is processed, i.e. 33, 34 and 35 are repeated and the frame counter is incremented.

Then, at 36, the circuitry 3 determines a particle weight $w_k$ for each particle of the set of particles, wherein the particle weight indicates a quality estimation of the particle. This is based on how well the current measurement fits the map hypothesis according to the following procedure.

The particle weight of each particle of the set of particles is determined based on the occupation probability of at least a part of the cells of the plurality of cells of the occupancy grid map of the particle.

Therefore, an average probability of the occupancy grid map is determined in the local update area (local grid), which results in a first weight $w^a$:

$$w^a = \frac{1}{J} \cdot \left( \sum_{j=1}^{J} f(m_j, z_{1:t}, x_{1:t}) \right),$$

wherein $$f(m_j, z_{1:t}, x_{1:t}) = \begin{cases} p(m_j \mid z_{1:t}, x_{1:t}), & p(m_j \mid z_{1:t}, x_{1:t}) > 0.5 \\ 0, & p(m_j \mid z_{1:t}, x_{1:t}) \leq 0.5 \end{cases}.$$

Then, a number of targets in the occupancy grid map is determined for estimating the sharpness of the map, which results in a second weight $w^b$:

$$w^b = \frac{1}{\sum_{i=1}^{I} g(m_i, z_{1:t}, x_{1:t})},$$

wherein $$g(m_i, z_{1:t}, x_{1:t}) = \begin{cases} 1, & p(m_i \mid z_{1:t}, x_{1:t}) > 0.5 \\ 0, & p(m_i \mid z_{1:t}, x_{1:t}) \leq 0.5 \end{cases}.$$

The particle weight for a particle k is then:

$$w^k = w^a \cdot w^b.$$

Generally, particles with a lower weight have a lower probability to be sampled again in the next frame.

At 37, the circuitry 3 performs resampling when the particle weight of a predetermined number of particles of the set of particles is below a predetermined threshold.

The particle resampling includes drawing with replacement from the set of particles, wherein a probability that a particle of the set of particles is drawn is based on the corresponding particle weight of the particle.

Hence, at 37, particles with a higher particle weight have a higher probability to be sampled again.

Then, the next frame is processed and the frame counter is incremented.

Then, 33 and 34 are performed again.

Then, at 35, scattering is performed again such that the resampled particles are further sampled differently.

Then, the circuitry 3 performs particle weighting at 36 and so on so forth until the method 30 is stopped.

Generally, the circuitry 3 and the method 30 provide a mapping and localization solution, that only relies on radar detections of radar sensors and that is independent from other sensors such as GPS or IMUs.

The independence from other localization systems as well as from other velocity estimating systems may generally improve existing techniques, since no additional sensors (a GPS or an IMU) may have to be installed on the mobile platform (such as the vehicle 1), which may result in cost savings. On the other hand, the exclusive use of one (radar) sensor system enables variable and independent temporal synchronization, which may be time consuming to implement when using multiple different sensor systems or must subsequently be taken into account in signal processing.

The grid map-based localization approach may further improve the overall system robustness. The matching in landmark-based self-localization methods is not required for this grid map-based self-localization algorithm. As generally known, in some cases, the matching in landmark-based self-localization methods may be complex and time-consuming.

Figure 4:
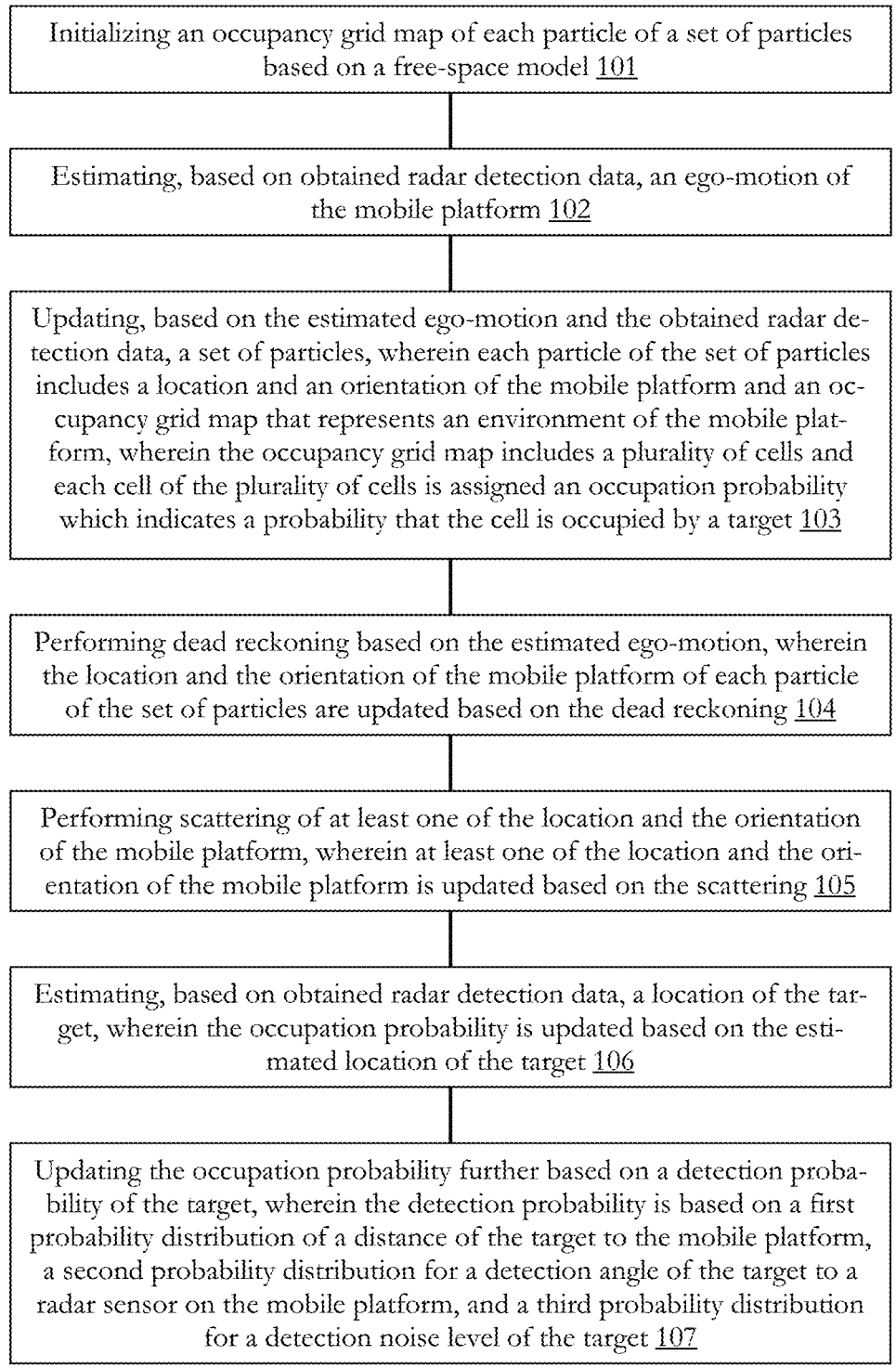
FIG. 4 schematically illustrates in a flow diagram a second embodiment of a method for simultaneous localization and mapping.

FIG. 4 schematically illustrates in a flow diagram a second embodiment of a method 100 for simultaneous localization and mapping.

The method 100 is performed by the circuitry 3 of FIG. 1.

At 101, an occupancy grid map of each particle of a set of particles is initialized based on a free-space model, as discussed herein.

At 102, based on obtained radar detection data, an ego-motion of the mobile platform is estimated, as discussed herein.

At 103, based on the estimated ego-motion and the obtained radar detection data, a set of particles is updated, wherein each particle of the set of particles includes a location and an orientation of the mobile platform and an occupancy grid map that represents an environment of the mobile platform, wherein the occupancy grid map includes a plurality of cells and each cell of the plurality of cells is assigned an occupation probability which indicates a probability that the cell is occupied by a target, as discussed herein.

At 104, dead reckoning is performed based on the estimated ego-motion, wherein the location and the orientation of the mobile platform of each particle of the set of particles are updated based on the dead reckoning, as discussed herein.

At 105, scattering of at least one of the location and the orientation of the mobile platform is performed, wherein at least one of the location and the orientation of the mobile platform is updated based on the scattering, as discussed herein.

At 106, based on obtained radar detection data, a location of the target is estimated, wherein the occupation probability is updated based on the estimated location of the target, as discussed herein.

At 107, the occupation probability is updated further based on a detection probability of the target, wherein the detection probability is based on a first probability distribution of a distance of the target to the mobile platform, a second probability distribution for a detection angle of the target to a radar sensor on the mobile platform, and a third probability distribution for a detection noise level of the target, as discussed herein.

FIG. 5 schematically illustrates in a flow diagram a third embodiment of a method 110 for simultaneous localization and mapping.

The method 110 is performed by the circuitry 3 of FIG. 1.

At 111, based on obtained radar detection data, an ego-motion of the mobile platform is estimated, as discussed herein.

At 112, based on the estimated ego-motion and the obtained radar detection data, a set of particles is updated, wherein each particle of the set of particles includes a location and an orientation of the mobile platform and an occupancy grid map that represents an environment of the mobile platform, wherein the occupancy grid map includes a plurality of cells and each cell of the plurality of cells is assigned an occupation probability which indicates a probability that the cell is occupied by a target, as discussed herein.

At 113, a particle weight for each particle of the set of particles is determined, wherein the particle weight indicates a quality estimation of the particle, as discussed herein.

At 114, the particle weight of each particle of the set of particles is determined based on the occupation probability of at least a part of the cells of the plurality of cells of the occupancy grid map of the particle, as discussed herein.

At 115, particle resampling is performed when the particle weight of a predetermined number of particles of the set of particles is below a predetermined threshold, as discussed herein.

At 116, performing the particle resampling includes drawing with replacement from the set of particles, wherein a probability that a particle of the set of particles is drawn is based on the corresponding particle weight of the particle, as discussed herein.

Figure 6:
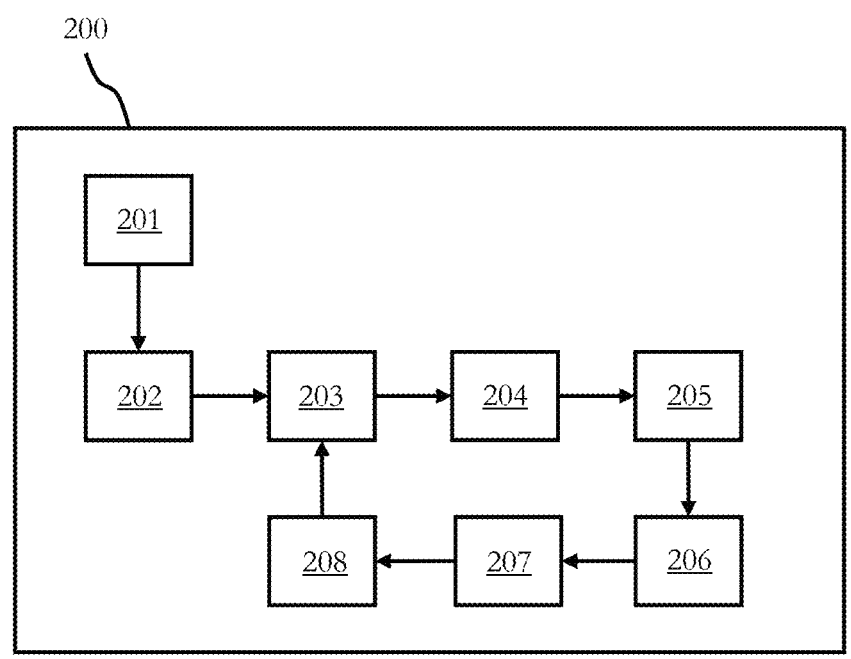
FIG. 6 schematically illustrates in a block diagram a second embodiment of a circuitry for simultaneous localization and mapping.

FIG. 6 schematically illustrates in a block diagram a second embodiment of a circuitry 200 for simultaneous localization and mapping.

The circuitry 200 includes a pose initialization unit 201, a map initialization unit 202, an ego-motion estimation unit 203, a dead reckoning unit 204, a particle scattering unit 205, a particle weighting unit 206, a resampling unit 207, and a map update unit 208.

The pose initialization unit 201 is configured to initialize a location and orientation of a set of particles, wherein each particle of the set of particles includes a location and an orientation of the mobile platform and an occupancy grid map that represents an environment of the mobile platform, wherein the occupancy grid map includes a plurality of cells and each cell of the plurality of cells is assigned an occupation probability which indicates a probability that the cell is occupied by a target.

The map initialization unit 202 is configured to initialize the occupancy grid map of each particle of the set of particles based on a free-space model.

The ego-motion estimation unit 203 is configured to estimate, based on obtained radar detection data, an ego-motion of the mobile platform.

The dead reckoning unit 204 is configured to perform dead reckoning based on the estimated ego-motion, wherein the location and the orientation of the mobile platform of each particle of the set of particles are updated based on the dead reckoning.

The particle scattering unit 205 is configured to perform scattering of at least one of the location and the orientation of the mobile platform, wherein at least one of the location and the orientation of the mobile platform is updated based on the scattering.

The particle weighting unit 206 is configured to determine a particle weight for each particle of the set of particles, wherein the particle weight indicates a quality estimation of the particle.

The particle weight of each particle of the set of particles is determined based on the occupation probability of at least a part of the cells of the plurality of cells of the occupancy grid map of the particle.

The resampling unit 207 is configured to perform particle resampling when the particle weight of a predetermined number of particles of the set of particles is below a predetermined threshold.

The particle resampling includes drawing with replacement from the set of particles, wherein a probability that a particle of the set of particles is drawn is based on the corresponding particle weight of the particle.

The map update unit 208 is configured to estimate, based on obtained radar detection data, a location of the target, wherein the occupation probability is updated based on the estimated location of the target.

The occupation probability is updated further based on a detection probability of the target, wherein the detection probability is based on a first probability distribution of a distance of the target to the mobile platform, a second probability distribution for a detection angle of the target to a radar sensor on the mobile platform, and a third probability distribution for a detection noise level of the target.

It should be recognized that the embodiments describe methods with an exemplary ordering of method steps. The specific ordering of method steps is however given for illustrative purposes only and should not be construed as binding.

Please note that the division of the circuitry 200 into units 201 to 208 is only made for illustration purposes and that the present disclosure is not limited to any specific division of functions in specific units. For instance, the circuitry 200 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A circuitry for simultaneous localization and mapping for a mobile platform, wherein the circuitry is configured to:
estimate, based on obtained radar detection data, an ego-motion of the mobile platform; and
update, based on the estimated ego-motion and the obtained radar detection data, a set of particles, wherein each particle of the set of particles includes a location and an orientation of the mobile platform and an occupancy grid map that represents an environment of the mobile platform, wherein the occupancy grid map includes a plurality of cells and each cell of the plurality of cells is assigned an occupation probability which indicates a probability that the cell is occupied by a target.

(2) The circuitry of (1), wherein the circuitry is further configured to determine a particle weight for each particle of the set of particles, wherein the particle weight indicates a quality estimation of the particle.

(3) The circuitry of (2), wherein the particle weight of each particle of the set of particles is determined based on the occupation probability of at least a part of the cells of the plurality of cells of the occupancy grid map of the particle.

(4) The circuitry of (2) or (3), wherein the circuitry is further configured to perform particle resampling when the particle weight of a predetermined number of particles of the set of particles is below a predetermined threshold.

(5) The circuitry of (4), wherein the particle resampling includes drawing with replacement from the set of particles, wherein a probability that a particle of the set of particles is drawn is based on the corresponding particle weight of the particle.

(6) The circuitry of anyone of (1) to (5), wherein the circuitry is further configured to estimate, based on obtained radar detection data, a location of the target, wherein the occupation probability is updated based on the estimated location of the target.

(7) The circuitry of (6), wherein the occupation probability is updated further based on a detection probability of the target, wherein the detection probability is based on a first probability distribution of a distance of the target to the mobile platform, a second probability distribution for a detection angle of the target to a radar sensor on the mobile platform, and a third probability distribution for a detection noise level of the target.

(8) The circuitry of anyone of (1) to (7), wherein the circuitry is further configured to perform dead reckoning based on the estimated ego-motion, wherein the location and the orientation of the mobile platform of each particle of the set of particles are updated based on the dead reckoning.

(9) The circuitry of anyone of (1) to (8), wherein the circuitry is further configured to perform scattering of at least one of the location and the orientation of the mobile platform, wherein at least one of the location and the orientation of the mobile platform is updated based on the scattering.

(10) The circuitry of anyone of (1) to (9), wherein the circuitry is further configured to initialize the occupancy grid map of each particle of the set of particles based on a free-space model.

(11) A method for simultaneous localization and mapping for a mobile platform, the method including:
estimating, based on obtained radar detection data, an ego-motion of the mobile platform; and
updating, based on the estimated ego-motion and the obtained radar detection data, a set of particles, wherein each particle of the set of particles includes a location and an orientation of the mobile platform and an occupancy grid map that represents an environment of the mobile platform, wherein the occupancy grid map includes a plurality of cells and each cell of the plurality of cells is assigned an occupation probability which indicates a probability that the cell is occupied by a target.

(12) The method of (11), further including:
determining a particle weight for each particle of the set of particles, wherein the particle weight indicates a quality estimation of the particle.

(13) The method of (12), wherein the particle weight of each particle of the set of particles is determined based on the occupation probability of at least a part of the cells of the plurality of cells of the occupancy grid map of the particle.

(14) The method of (12) or (13), further including:
performing particle resampling when the particle weight of a predetermined number of particles of the set of particles is below a predetermined threshold.

(15) The method of (14), wherein the particle resampling includes drawing with replacement from the set of particles, wherein a probability that a particle of the set of particles is drawn is based on the corresponding particle weight of the particle.

(16) The method of anyone of (11) to (15), further including:
estimating, based on obtained radar detection data, a location of the target, wherein the occupation probability is updated based on the estimated location of the target.

(17) The method of (16), wherein the occupation probability is updated further based on a detection probability of the target, wherein the detection probability is based on a first probability distribution of a distance of the target to the mobile platform, a second probability distribution for a detection angle of the target to a radar sensor on the mobile platform, and a third probability distribution for a detection noise level of the target.

(18) The method of anyone of (11) to (17), further including:
performing dead reckoning based on the estimated ego-motion, wherein the location and the orientation of the mobile platform of each particle of the set of particles are updated based on the dead reckoning.

(19) The method of anyone of (11) to (18), further including:
performing scattering of at least one of the location and the orientation of the mobile platform, wherein at least one of the location and the orientation of the mobile platform is updated based on the scattering.

(20) The method of anyone of (11) to (19), further including:
initializing the occupancy grid map of each particle of the set of particles based on a free-space model.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. A circuitry for simultaneous localization and mapping for a mobile platform, the circuitry being configured to:
    estimate, based on obtained radar detection data, an ego-motion of the mobile platform,
    update, based on the estimated ego-motion and the obtained radar detection data, a set of particles, wherein each particle of the set of particles includes a location and an orientation of the mobile platform and an occupancy grid map that represents an environment of the mobile platform, wherein the occupancy grid map includes a plurality of cells and each cell of the plurality of cells is assigned an occupation probability which indicates a probability that the cell is occupied by a target, and
    estimate, based on the obtained radar detection data, a location of the target, wherein the occupation probability is updated based on the estimated location of the target,
    wherein the occupation probability is updated further based on a detection probability of the target, wherein the detection probability is based on a first probability distribution of a distance of the target to the mobile platform, a second probability distribution for a detection angle of the target to a radar sensor on the mobile platform, and a third probability distribution for a detection noise level of the target.

2. The circuitry according to claim 1, wherein the circuitry is further configured to determine a particle weight for each particle of the set of particles, wherein the particle weight indicates a quality estimation of the particle.

3. The circuitry according to claim 2, wherein the particle weight of each particle of the set of particles is determined based on the occupation probability of at least a part of the cells of the plurality of cells of the occupancy grid map of the particle.

4. The circuitry according to claim 3, wherein the particle weight is determined based on a number of targets in the occupancy grid map.

5. The circuitry according to claim 3, wherein the particle weight is determined based on an average probability of the occupancy grid map in a local update area corresponding to local grids of the radar sensors.

6. The circuitry according to claim 3, wherein the particle weight is determined by multiplying a particle weight determined based on a number of targets in the occupancy grid map with a particle weight determined based on an average probability of the occupancy grid map in a local update area corresponding to local grids of the radar sensors.

7. The circuitry according to claim 2, wherein the circuitry is further configured to perform particle resampling when the particle weight of a predetermined number of particles of the set of particles is below a predetermined threshold.

8. The circuitry according to claim 7, wherein the particle resampling includes drawing with replacement from the set of particles, wherein a probability that a particle of the set of particles is drawn is based on the corresponding particle weight of the particle.

9. The circuitry according to claim 1, wherein the circuitry is further configured to perform dead reckoning based on the estimated ego-motion, wherein the location and the orientation of the mobile platform of each particle of the set of particles are updated based on the dead reckoning.

10. The circuitry according to claim 1, wherein the circuitry is further configured to perform scattering of at least one of the location and the orientation of the mobile platform, wherein at least one of the location and the orientation of the mobile platform is updated based on the scattering.

11. The circuitry according to claim 10, wherein the circuitry is further configured to
    determine a location of the target based on the scattered location and orientation of the mobile platform.

12. The circuitry according to claim 1, wherein the circuitry is further configured to initialize the occupancy grid map of each particle of the set of particles based on a free-space model.

13. A method for simultaneous localization and mapping for a mobile platform, the method comprising:
    estimating, based on obtained radar detection data, an ego-motion of the mobile platform;
    updating, based on the estimated ego-motion and the obtained radar detection data, a set of particles, wherein each particle of the set of particles includes a location and an orientation of the mobile platform and an occupancy grid map that represents an environment of the mobile platform, wherein the occupancy grid map includes a plurality of cells and each cell of the plurality of cells is assigned an occupation probability which indicates a probability that the cell is occupied by a target; and
    estimating, based on the obtained radar detection data, a location of the target, wherein the occupation probability is updated based on the estimated location of the target,
    wherein the occupation probability is updated further based on a detection probability of the target, wherein the detection probability is based on a first probability distribution of a distance of the target to the mobile platform, a second probability distribution for a detection angle of the target to a radar sensor on the mobile platform, and a third probability distribution for a detection noise level of the target.

14. The method according to claim 13, further comprising:
    determining a particle weight for each particle of the set of particles, wherein the particle weight indicates a quality estimation of the particle.

15. The method according to claim 14, wherein the particle weight of each particle of the set of particles is determined based on the occupation probability of at least a part of the cells of the plurality of cells of the occupancy grid map of the particle.

16. The method according to claim 14, further comprising:
    performing particle resampling when the particle weight of a predetermined number of particles of the set of particles is below a predetermined threshold.

17. The method according to claim 16, wherein the particle resampling includes drawing with replacement from the set of particles, wherein a probability that a particle of the set of particles is drawn is based on the corresponding particle weight of the particle.

18. The method according to claim 13, further comprising:

performing dead reckoning based on the estimated egomotion, wherein the location and the orientation of the mobile platform of each particle of the set of particles are updated based on the dead reckoning.

19. The method according to claim 13, further comprising:

performing scattering of at least one of the location and the orientation of the mobile platform, wherein at least one of the location and the orientation of the mobile platform is updated based on the scattering.

20. The method according to claim 13, further comprising:

initializing the occupancy grid map of each particle of the set of particles based on a free-space model.

* * * * *